United States Patent
Hirschhorn

[15] 3,698,042
[45] Oct. 17, 1972

[54] ROPE CLAMPS

[72] Inventor: Sidney H. Hirschhorn, 8-20 Fairlawn Avenue, Fairlawn, N.J. 07410

[22] Filed: Jan. 25, 1971

[21] Appl. No.: 109,355

[52] U.S. Cl. .................................. 24/19, 24/132 AA
[51] Int. Cl. ........................ B65d 63/00, F16g 11/00
[58] Field of Search............24/266, 16, 19, 71.1, 125, 24/135, 278, 263 LS, 132 AA, 132 PT, 132 AC, 132 AS, 132 CS

[56] References Cited

UNITED STATES PATENTS

| 73,358 | 1/1968 | McCeney........24/132 PT UX |
| 1,764,380 | 6/1930 | Allen ......................24/135 R |
| 2,634,474 | 4/1953 | Grayson...................24/125 R |

FOREIGN PATENTS OR APPLICATIONS

| 308,058 | 3/1929 | Great Britain ........24/132 AA |

*Primary Examiner*—Donald A. Griffin

[57] ABSTRACT

Two plates having means extending through aligned holes so as to draw the plates towards one another to clamp an intermediate portion of a rope extending through a hole in each of the plates, the latter holes offset from one another, and one of the plates being adapted to be engaged by an end portion of the rope so as to form a loop in the rope intermediate the end portion and the clamped portion.

3 Claims, 5 Drawing Figures

PATENTED OCT 17 1972　　　　　　　　　　3,698,042
FIG. 1
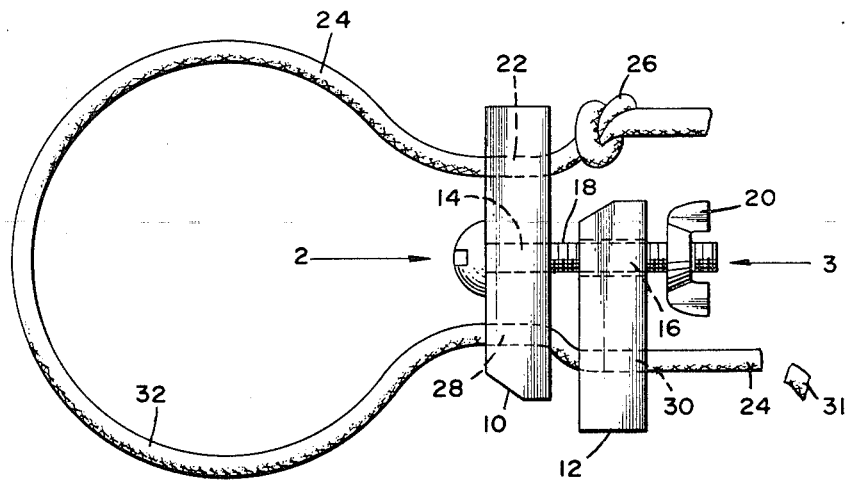
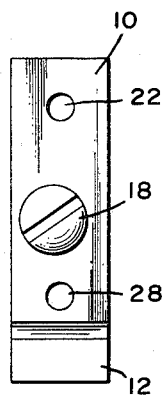
FIG. 2
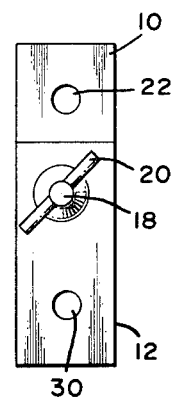
FIG. 3
FIG. 4
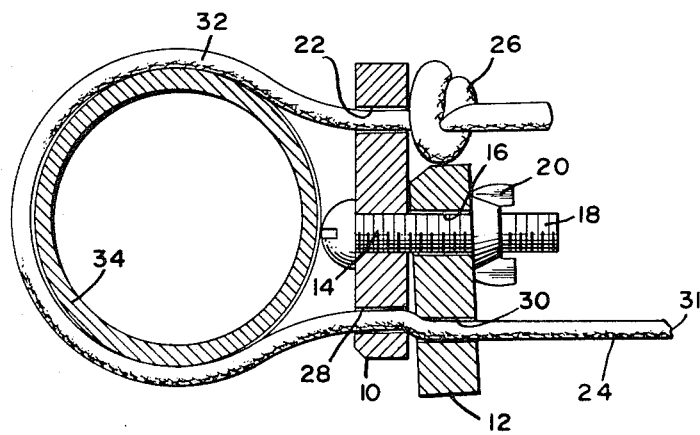

ROPE CLAMPS

This invention relates to rope clamps and in particular to those clamps which may be readily loosened and tightened.

The fundamental object of the invention is to replace the tying and untying of knots wherever rope is used. Another fundamental purpose of the invention is to tie elements or objects together; it is used to tie elements or objects of diverse sizes together or to package them into a unitized mass. Moreover, a specific, desired degree of tension may be maintained by the clamp.

The rope clamp of the invention can be used in such diverse activities as boating, camping, on top of automobiles or in trucks, holding an airplane to the ground or a badminton set, tying wheels to luggage, ad infinitum.

The objects, advantages, features and uses of the invention will become apparent during the course of the following explanation when taken in conjunction with the accompanying drawings wherein:

FIG. 1 is a plan view of the rope clamp of the invention in its slack position;

FIG. 2 is a view in the direction of arrow 2 of FIG. 1, with the rope removed;

FIG. 3 is a view in the direction of arrow 3 of FIG. 1, with the rope removed; and FIG. 4 is a view similar to that of FIG. 1 with the rope clamp applied to a pipe and tightened.

The rope clamp of the invention comprises a pair of blocks 10 and 12 of any rigid material such as wood, metal, plastic, etc. having a pair of aligned holes 14 and 16 to receive a bolt 18 on which a wing nut 20 is preferably threaded. Hole 14 is of such size that bolt 18 is firmly held. Other means for holding it in position may also be used. Block 10 is provided with a hole 22 through which a rope 24 is threaded and knotted in position as shown at 26. Block 10 is also provided with a hole 28 which is offset from a similar hole 30 in block 12. Rope 24 is threaded through both these holes 28 and 30 so the free end 31 is in the position as shown in FIGS. 1 and 4.

A loop 32 is formed in rope 24 as shown in FIGS. 1 and 4. To use the rope clamp of the invention, the wing nut 20 is loosened so that the blocks 10 and 12 may be separated and the loop 32 is adjustable. Then, the loop 32 is placed around a pipe or spar or similar construction 34 and the blocks are joined and pushed together as wing nut 20 is tightened. FIG. 4 illustrates this condition. It can be seen that the rope is pinched by the offset holes 28 and 30 so as to effectively lock the rope in position.

It can also be seen that it is very easy to loosen the clamp and remove the rope from the pipe without untying the loop 32.

Loop 32 is held by 2 couplings; one of which is formed by offset holes 28 and 30 and the other by hole 22 and knot 26 as shown in FIG. 4. When it is required that one of the couplings of loop 32 be removed from the clamp in order to envelop an object, this is easily accomplished and the removed end can be replaced in its former position to re-form loop 32.

Clamps of the invention may also be used to hold a pair of ropes anchored at their far end to objects. It is simply a matter of each coupling supporting its own rope, and the principle of fastening and loosening still operates in the clamp.

The rope clamp of the invention may also be used to tie around parallelepipeds or similar straight-sided figures. In such cases, the portions of the loop extended outward from holes 22 and 28 of block 10 are aligned so that they appear to be a part of a straight line.

As many apparently widely different embodiments of the present invention may be made without departing from the spirit and scope thereof, it is to be understood that the invention is not limited to the specific embodiments.

What is claimed is:

1. A rope clamp comprising a pair of plates having a pair of aligned holes and a pair of offset holes, means extending through the aligned holes so as to draw the two plates together to clamp a portion of a rope extending through the offset holes, a second portion of said rope being secured to one of said plates so as to form a noose in the rope intermediate said clamped portion and said second portion.

2. A rope clamp comprising a pair of plates having a pair of aligned bores, a bolt extending through said pair of aligned bores, one of said plates having a second bore substantially parallel to and laterally displaced from the axis of said pair of bores, the other of said plates having a bore offset from said second bore, and a nut on said bolt adapted to be advanced on said bolt to draw said plates towards one another so as to clamp a portion of a rope extending through said offset bores in the respective plates.

3. A rope clamp according to claim 2 to which an end portion of the rope is secured to one of said plates to form a loop in the rope intermediate said secured end portion and said clamped portion.

* * * * *